United States Patent
Callard et al.

(10) Patent No.: US 9,906,342 B2
(45) Date of Patent: Feb. 27, 2018

(54) SYSTEM AND METHOD FOR LOW-PAYLOAD ACKNOWLEDGMENT

(71) Applicant: Huawei Technologies Co., Ltd., Shenzhen (CN)

(72) Inventors: Aaron James Callard, Ottawa (CA); Alex Stephenne, Stittsville (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 14/537,615

(22) Filed: Nov. 10, 2014

(65) Prior Publication Data

US 2016/0134399 A1    May 12, 2016

(51) Int. Cl.
| | |
|---|---|
| *H04W 4/00* | (2009.01) |
| *H04L 5/00* | (2006.01) |
| *H04W 4/12* | (2009.01) |
| *H04L 1/14* | (2006.01) |
| *H04L 1/16* | (2006.01) |

(52) U.S. Cl.
CPC .............. *H04L 5/0046* (2013.01); *H04L 1/14* (2013.01); *H04L 1/1607* (2013.01); *H04W 4/12* (2013.01)

(58) Field of Classification Search
USPC .......... 370/311–401; 455/442–450, 512–522
See application file for complete search history.

(56) References Cited

U.S. PATENT DOCUMENTS

| | | | | |
|---|---|---|---|---|
| 7,414,989 B2* | 8/2008 | Kuchibhotla | ......... | H04L 1/1671 370/329 |
| 7,509,554 B2* | 3/2009 | Lohr | ..................... | H04L 1/1845 714/748 |
| 7,783,949 B2* | 8/2010 | Lohr | ..................... | H04L 1/0006 714/751 |
| 7,818,647 B2* | 10/2010 | Lohr | ..................... | H04L 1/1678 370/473 |
| 7,869,461 B2* | 1/2011 | Lohr | ..................... | H04L 1/1812 370/395.4 |
| 7,979,770 B2* | 7/2011 | Lohr | ..................... | H04L 1/0006 714/751 |
| 7,983,234 B2* | 7/2011 | Taki | ...................... | H04L 1/1614 370/338 |
| 8,386,870 B2* | 2/2013 | Graumann | ........... | H04L 1/0025 714/748 |
| 8,472,365 B2* | 6/2013 | Liu | ........................ | H04L 1/1664 370/312 |
| 8,594,029 B2* | 11/2013 | Torsner | ................ | H04L 1/1822 370/329 |
| 8,775,502 B2* | 7/2014 | Serban | .................... | H04W 4/00 709/203 |

(Continued)

FOREIGN PATENT DOCUMENTS

WO    2013033693 A2    3/2013

*Primary Examiner* — Man Phan
(74) *Attorney, Agent, or Firm* — Slater Matsil, LLP

(57) ABSTRACT

An embodiment method of indicating reception of a plurality of low-payload messages includes receiving the plurality of low-payload messages from respective user equipments (UEs). The method also includes generating a composite reception indication (RIND) containing a RIND for each of the plurality of low-payload messages. The method also includes broadcasting the composite RIND to the respective UEs.

28 Claims, 6 Drawing Sheets

(56) References Cited

U.S. PATENT DOCUMENTS

| | | | |
|---|---|---|---|
| 8,966,334 B2* | 2/2015 | Lohr | H04L 1/0006 |
| | | | 370/328 |
| 8,995,383 B2* | 3/2015 | Torsner | H04L 1/1822 |
| | | | 370/329 |
| 9,020,487 B2* | 4/2015 | Brisebois | H04W 8/245 |
| | | | 370/328 |
| 9,083,501 B2* | 7/2015 | Luo | H04L 5/0055 |
| 9,100,177 B2* | 8/2015 | Dangui | H04L 1/1614 |
| 9,143,973 B2* | 9/2015 | Choudhury | H04W 24/10 |
| 9,215,041 B2* | 12/2015 | Lohr | H04L 1/0006 |
| 9,450,828 B2* | 9/2016 | Serban | H04W 4/00 |
| 2009/0327443 A1* | 12/2009 | Pawar | H04L 1/1607 |
| | | | 709/207 |
| 2010/0037112 A1 | 2/2010 | Graumann | |
| 2011/0032925 A1 | 2/2011 | Lee et al. | |
| 2011/0216714 A1 | 9/2011 | Lee et al. | |
| 2011/0243012 A1 | 10/2011 | Luo et al. | |
| 2013/0010729 A1 | 1/2013 | Novak et al. | |
| 2013/0258874 A1* | 10/2013 | Khoshnevis | H04L 5/0057 |
| | | | 370/252 |

\* cited by examiner

SYSTEM AND METHOD FOR LOW-PAYLOAD ACKNOWLEDGMENT

TECHNICAL FIELD

The present invention relates generally to acknowledging low-payload messages in wireless systems, and, in particular embodiments, to a base station, a user equipment (UE), and methods for transmitting and acknowledging low-payload messages.

BACKGROUND

Driven largely by smart phones, tablets, and video streaming, the amount of wireless data handled by wireless networks has risen markedly and is expected to continue to rise by orders of magnitude over the next ten years. In addition to the sheer volume of data, the number of devices is expected to continue to grow exponentially, possibly reaching into the billions of devices, along with radically higher data rates. Different applications will place different requirements on the performance of future wireless networks. Future wireless networks are expected to be highly flexible, highly efficient, open, and customizable for customers and consumers.

In addition, with the increased deployment of small cells, heterogeneous networks (het-nets), machine to machine (M2M) communications, and networks of devices, where thousands or millions of devices are attached, there is a need for optimization in the application layers and in the physical layers of a wireless access link.

SUMMARY

An embodiment method of indicating reception of a plurality of low-payload messages includes receiving the plurality of low-payload messages from respective user equipments (UEs). The method also includes generating a composite reception indication (RIND) containing a RIND for each of the plurality of low-payload messages. The method also includes transmitting the composite RIND to the respective UEs.

An embodiment method of transmitting a low-payload message includes transmitting an original message having payload data to a base station. The method also includes receiving a composite RIND broadcast. The method also includes extracting a RIND corresponding to the original message from the composite RIND broadcast. The method also includes evaluating the extracted RIND relative to the payload data in the original message. The method also includes initiating a correction procedure when the evaluating indicates an error in receiving the original message at the base station.

An embodiment base station includes a radio resource controller (RRC), a receiver, a processor, and a transmitter. The RRC is configured to provision at least one physical uplink channel (PUCH) over which a plurality of low-payload messages are received from respective UEs. The receiver is configured to receive the low-payload messages and detect respective payload data. The processor is configured to generate a composite RIND containing respective RINDs for each of the plurality of low-payload messages according to the respective payload data. The transmitter is configured to transmit the composite RIND to the respective UEs.

An embodiment UE includes a transmitter, a receiver, and a processor. The transmitter is configured to transmit an original message having payload data to a base station. The receiver is configured to receive a composite RIND. The processor is configured to extract a RIND corresponding to the original message from the composite RIND. The processor is further configured to evaluate the extracted RIND relative to the payload data. The processor is further configured to initiate a correction procedure when the extracted RIND indicates an error in receiving the original message at the base station.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
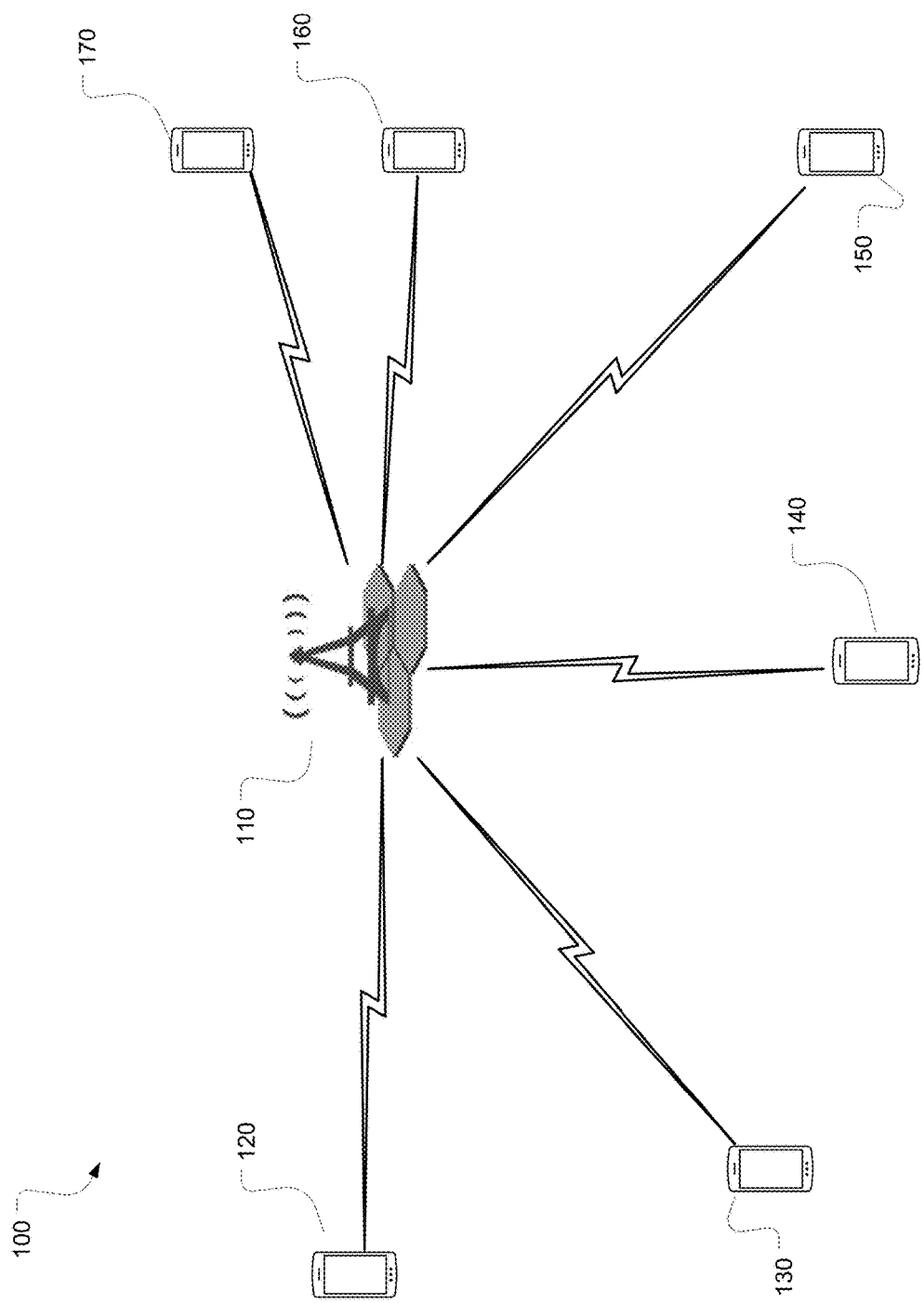
FIG. 1 is a diagram of a wireless communication system.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

In wireless communication systems, various indications and other low-payload message transmissions are made by devices to applications or to the network via uplink (UL) transmissions. The various indications include one-bit indications such as presence indications, keep-alive signaling, and service requests, among others. In current systems, these transmissions can create an inordinate amount of signaling and overhead on the radio link and in the application layers. For example, both a UE sending a 1-bit payload protected by a cyclic redundancy check (CRC) and a base station sending back an acknowledgement or negative acknowledgement (ACK or NACK) transmission incur a relatively large amount of overhead. These inefficiencies apply to many low-payload messages. A low-payload message can be transmitted without a CRC. A more efficient approach may be used to determine if a low-payload message was correctly received by a base station. In particular, a reception indication (RIND) can be transmitted by the base station to a UE to indicate that a low-payload message has been received by the base station. The UE then compares the RIND to its original low-payload message to determine if the message was correctly received.

Transmission of ACK/NACK may also be wasteful with respect to use of radio resources and low-payload transmissions can be acknowledged in a more efficient manner. When a base station receives multiple low-payload messages over various UL channels, the base station can indicate it received the multiple low-payload messages in a single composite RIND. A base station is sometimes referred to as an access point (AP), a station, a node B, or an enhanced node B (eNB), among other references. The composite RIND can be broadcast to the respective devices that originated the multiple low-payload messages. A device is sometimes referred to as a UE, a mobile device, a mobile, a terminal, a user, or a station, among other references. Each device determines which portion of the composite RIND corresponds to its UL message and determines whether the transmission was successful or whether some correction is needed. The overhead for including an error detection code, such as a CRC, for each RIND, can be excessive both in the uplink and in the downlink response.

When the base station receives the low-payload UL transmissions, it detects the payload data. The amount of payload data in a low-payload message can vary per system. In certain systems, a low-payload includes from 1 to 20 bits of data. In other embodiments, a larger payload may be considered low-payload, for example 100 bits. The precise distinction between low-payload and a normal payload depends on the overhead structure for a communication system. For example, in certain embodiments, a low-payload message is a message without an error detection code and a normal payload message is one with an error detection code. In some systems, the overhead involved in transmitting a 20 bit payload is excessive. In other systems, the overhead for transmitting a 20 bit payload is manageable. In certain systems, the overhead for transmitting a 30 bit payload is excessive.

Rather than transmitting individual RINDs to the various UEs, the base station can generate a composite RIND that can be broadcast to the various UEs. The composite RIND can include multiple elements corresponding to respective UEs. More specifically, each element corresponds to a RIND for a received low-payload message, which is useful in systems where a given UE transmits more than one low-payload message. In some embodiments, the base station can compute an error detection code, such as a CRC, for the composite RIND, which is included in the composite RIND transmission. In certain embodiments, the composite RIND simply echoes back the detected payload from each of the received low-payload messages. For example, in an embodiment where the low-payload messages each have a 1 bit payload, the base station packs each 1 bit detected payload into a bitmap for the composite RIND. In other embodiments, the base station can also include a disposition instruction in the RIND for the originating UEs, for example, indicating resources allocated for a channel over which additional data can be transmitted.

In yet another embodiment, where the low-payload messages each have a multiple bit payload, the base station can compute a signature for the received low-payload transmission and use that as the RIND for the message. The signature can be, in certain embodiments, based on a CRC or a secure hash (SHA) function. The signature is sometimes referred to as a hash. In some embodiments, the elements of the composite RIND may be compressed before transmission using standard compression techniques, including, for example, arithmetic coding. With the composite RIND, resources are conserved by encoding the composite RIND in a single transmission using a single CRC.

The number of elements in a composite RIND can be the same as the number of UEs that are allocated resources in the low-payload uplink channel. In certain embodiments, the number of elements can be reduced to a subset of UEs addressed in the broadcast channel. For example, if UEs are separated into groups of different geometry, each broadcast of the composite RIND can be addressed to one particular group of UEs at different times. The broadcast pattern for each group is known at the transmitter and receiver via configuration signaling. In other embodiments, the predictability of the low-payload traffic from UEs can be utilized to reduce the number of elements in the composite RIND, such that each broadcast of the composite RIND corresponds to the UEs' low-payload traffic generated over a certain time interval.

When a particular UE receives the broadcasted composite RIND, it determines which element of the composite RIND corresponds to its transmission and extracts its individual RIND. The UE compares its RIND to the original low-payload message. In embodiments that echo the payload back in the composite RIND, the value of the individual RIND is simply compared to the original payload data. If the RIND and data match, the transmission is considered successful. Otherwise, the UE can undertake some corrective action. In embodiments where the base station computes a signature for the respective payloads and places the signature into the composite RIND, the UE checks the returned signature against a signature computed for the low-payload message by the UE. If the signatures match, the transmission is considered successful. Otherwise, the UE can undertake some corrective action. If the composite RIND does not include an individual RIND associated with the UE's original low-payload message, the UE can undertake some corrective action. In other embodiments, where the RIND includes a disposition instruction, the UE checks the RIND against the low-payload message and takes the appropriate action according to the disposition instruction.

Higher-layer entities can request creation of a radio bearer for transmission of small amounts of information from devices. The low-payload message can involve multi-byte packet transmissions over an uplink channel. For example, in a 3GPP LTE system, the transmission may be over a physical uplink shared channel (PUSCH). In certain embodiments, a UE has initial access to a network base station over a random access channel (RACH) or physical RACH (PRACH). In alternative embodiments, the UE can use other methods to notify the base station. The UE notifies the base station that it needs to send data, what kind of data will be transmitted, and how much. The base station then allocates resources for the uplink channel accordingly.

FIG. 1 is a diagram of one embodiment of a wireless communication system 100 within which a base station and a method of acknowledging low-payload messages may be embodied or carried out. The wireless communication system 100 includes a base station 110 that serves one or more UEs, such as UE 120, UE 130, UE 140, UE 150, UE 160 and UE 170, by receiving communications originating from the UEs and forwarding the communications to their respective intended destinations, or by receiving communications destined for the UEs and forwarding the communications to their respective intended UEs. Some UEs can communicate directly with one another as opposed to communicating through the base station 110.

Figure 2:
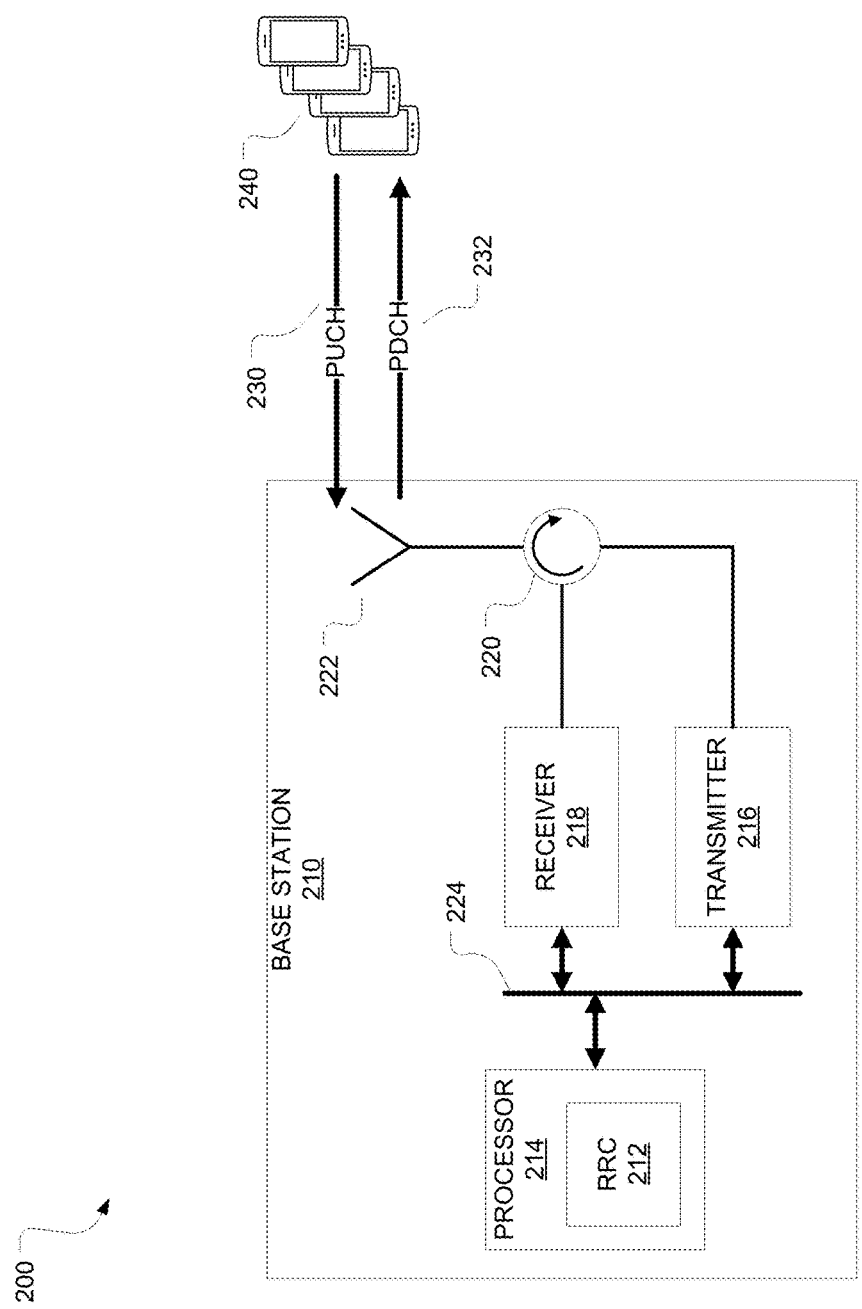
FIG. 2 is a block diagram of one embodiment of a base station.

FIG. 2 is a block diagram of one embodiment of a communication system 200. Within communication system 200, a base station 210 communicates with UEs 240. Base station 210 includes a processor 214, a transmitter 216, a receiver 218, an isolator 220, an antenna 222, and a data bus 224. Processor 214 includes a radio resource controller (RRC) 212 and communicates to receiver 218 and transmitter 216 through data bus 224. Transmissions are made by transmitter 216 through isolator 220 and antenna 222. Transmissions are received through antenna 222, isolator 220, and receiver 218. Data is relayed among processor 214, receiver 218, and transmitter 216 over data bus 224.

Processor 214 can be implemented in one or more processors, one or more application specific integrated circuits (ASICs), one or more field-programmable gate arrays (FPGAs), dedicated logic circuitry, or any combination thereof, all collectively referred to as a processor. The various functions for processor 214 can be stored as instructions in a non-transitory memory for execution by the processor.

RRC 212 allocates time and frequency resources to establish radio bearers for UL and downlink (DL) channels. Processor 214 is configured to execute a protocol stack that can contain various layers, such as a packet data convergence protocol (PDCP) layer, a radio link control (RLC) layer, a media access control (MAC) layer, and a physical (PHY) layer, among others. Data signals and control signals flowing between base station 210 and UEs 240 are processed by processor 214.

At the PHY layer of base station 210, data is transmitted to UEs 240 via transmitter 216 over a DL channel, e.g., a physical downlink channel (PDCH) 232. Data is received at base station 210 via receiver 218 from UEs 240 over at least one UL channel, e.g., physical uplink channel (PUCH) 230. Base station 210 receives multiple low-payload messages from UEs 240 over PUCHs 230. The received signals are initially received at antenna 222 and passed through isolator 220 before arriving at receiver 218. Once converted to baseband digital signals, processor 214 processes the received signals and detects and decodes the payload data in each of the low-payload messages. Processor 214 then determines a RIND for each of the decoded low-payload messages. The RIND can include the original low-payload message, detected payload data, a signature, or a disposition instruction for the originating UE. Processor 214 combines the RINDs for each of the low-payload messages into a composite RIND. The combining can take a variety of forms. In certain embodiments, the combining can be accomplished with a RIND bitmap, where each low-payload message is allocated one or more bits in the RIND bitmap. The composite RIND can then be encoded and broadcast back to UEs 240 through transmitter 216 over PDCH 232.

Figure 3:
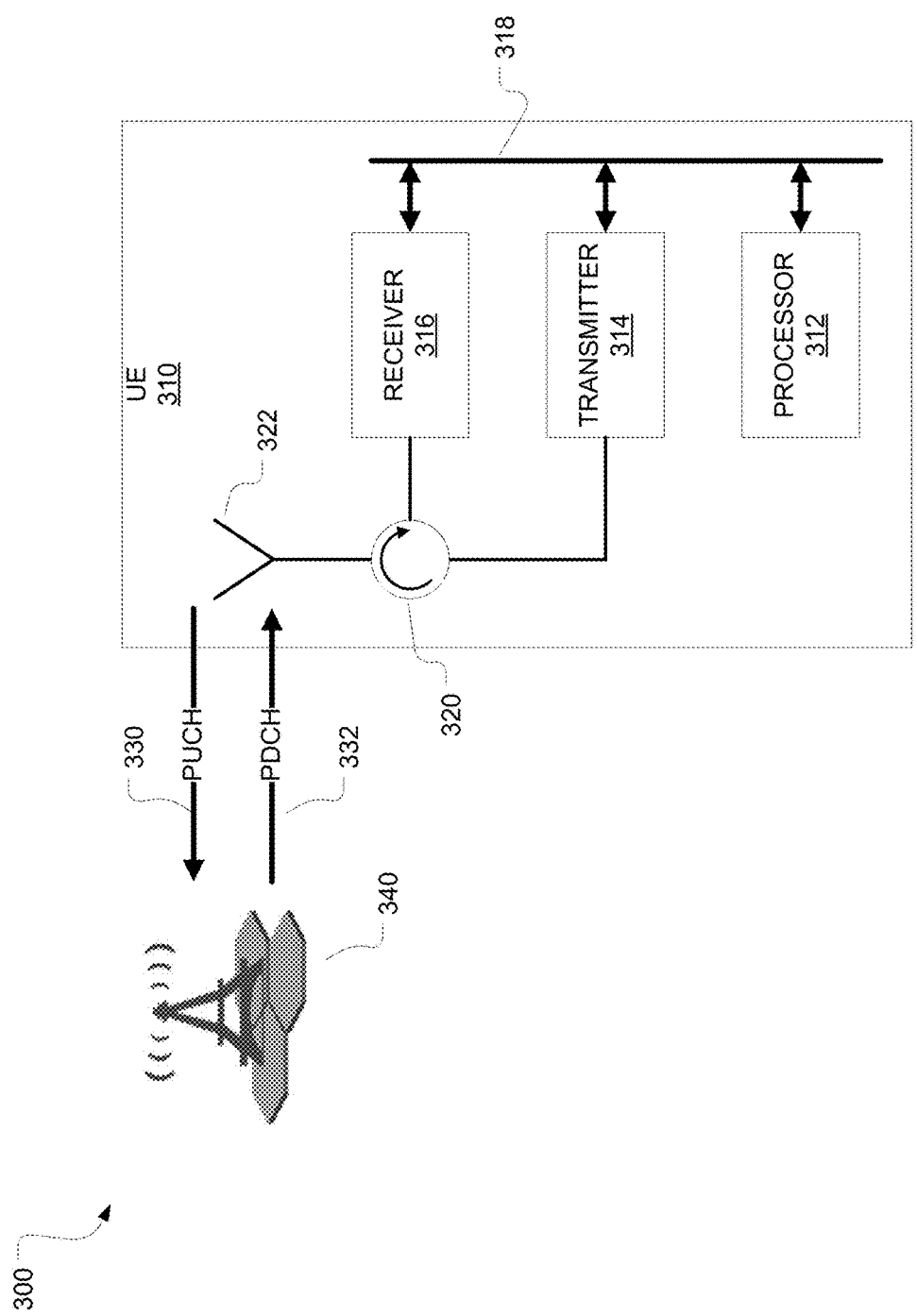
FIG. 3 is a block diagram of one embodiment of a UE.

FIG. 3 is a block diagram of another embodiment of a communication system 300. Within communication system 300, a UE 310 communicates with a base station 340. UE 310 includes a processor 312, a transmitter 314, a receiver 316, a data bus 318, an isolator 320, and an antenna 322. Processor 312 communicates to receiver 316 and transmitter 314 through data bus 318. Transmissions are made by transmitter 314 through isolator 320 and antenna 322. Transmissions are received through antenna 322, isolator 320, and receiver 316. Data is relayed among processor 312, transmitter 314, and receiver 316 over data bus 318.

Processor 312, receiver 316, and transmitter 314 can be implemented in one or more processors, one or more application specific integrated circuits (ASICs), one or more field-programmable gate arrays (FPGAs), dedicated logic circuitry, or any combination thereof, all collectively referred to as a processor. The respective functions for processor 312, receiver 316, and transmitter 314 can be stored as instructions in non-transitory memory for execution by the processor.

Processor 312 is configured to execute a protocol stack that can contain various layers, including a PDCP layer, a RLC layer, a MAC layer, and a PHY layer, among others. Data signals and control signals flowing between UE 310 and base station 340 are processed by processor 312.

At the PHY layer of UE 310, data is transmitted to base station 340 via transmitter 314 over an UL channel, e.g., a PUCH 330. Data is received at UE 310 via receiver 316 from base station 340 over a DL channel, e.g., a PDCH 332. Processor 312 generates a low-payload message that is to be transmitted to base station 340. The low-payload message is then passed to transmitter 314 over data bus 318. UE 310 transmits the low-payload message over PUCH 330 through antenna 322. UE 310 waits for a RIND from base station 340. UE 310 monitors downlink channels over which the RIND may be transmitted. The amount of time waited can vary and is typically specified as an acknowledgment period. If no RIND is received in that period, UE 310 assumes base station 340 did not receive the low-payload message and a correction procedure is initiated.

When base station 340 receives the low-payload message, base station 340 broadcasts a composite RIND over PDCH 332. UE 310 receives the composite RIND at receiver 316. Receiver 316 passes the received message to processor 312. The composite RIND contains RINDs for multiple low-payload messages received by base station 340 that were transmitted by various UEs, one of which is UE 310. Processor 312 extracts a RIND corresponding to its low-payload message from the composite RIND. In certain embodiments, the ACK is an echo of the payload data transmitted in the original low-payload message and detected by base station 340. Processor 312 compares the echoed payload data to the originally transmitted payload data. If the echoed payload matches the transmitted payload, base station 340 has successfully received the low-payload message. In other embodiments, the RIND is a signature computed by base station 340 according to the detected original low-payload message. Processor 312 compares the signature to the transmitted payload data to determine the success of the transmission. In certain embodiments, the RIND can include disposition instructions for UE 310 to carry out. For example, in some embodiments, a RIND can be accompanied by an indicator that resources are allocated for a channel over which additional data can be transmitted.

When the RIND is not received or when the received RIND indicates an unsuccessful receipt of the low-payload message by base station 340, processor 312 initiates a correction procedure. Many different correction procedures are possible. In certain embodiments, the correction procedure includes retransmitting the original payload in a new low-payload message. In another embodiment, the correction procedure includes transmitting a new low-payload message with updated data in the payload. The use of one correction procedure over another depends on the communication system. For example, in certain embodiments where a given low-payload message is transmitted periodically, by the time a RIND is received by UE 310, new data is available for the next periodic transmission. When the original payload data is no longer useful, there is no value in retransmitting.

Figure 4:
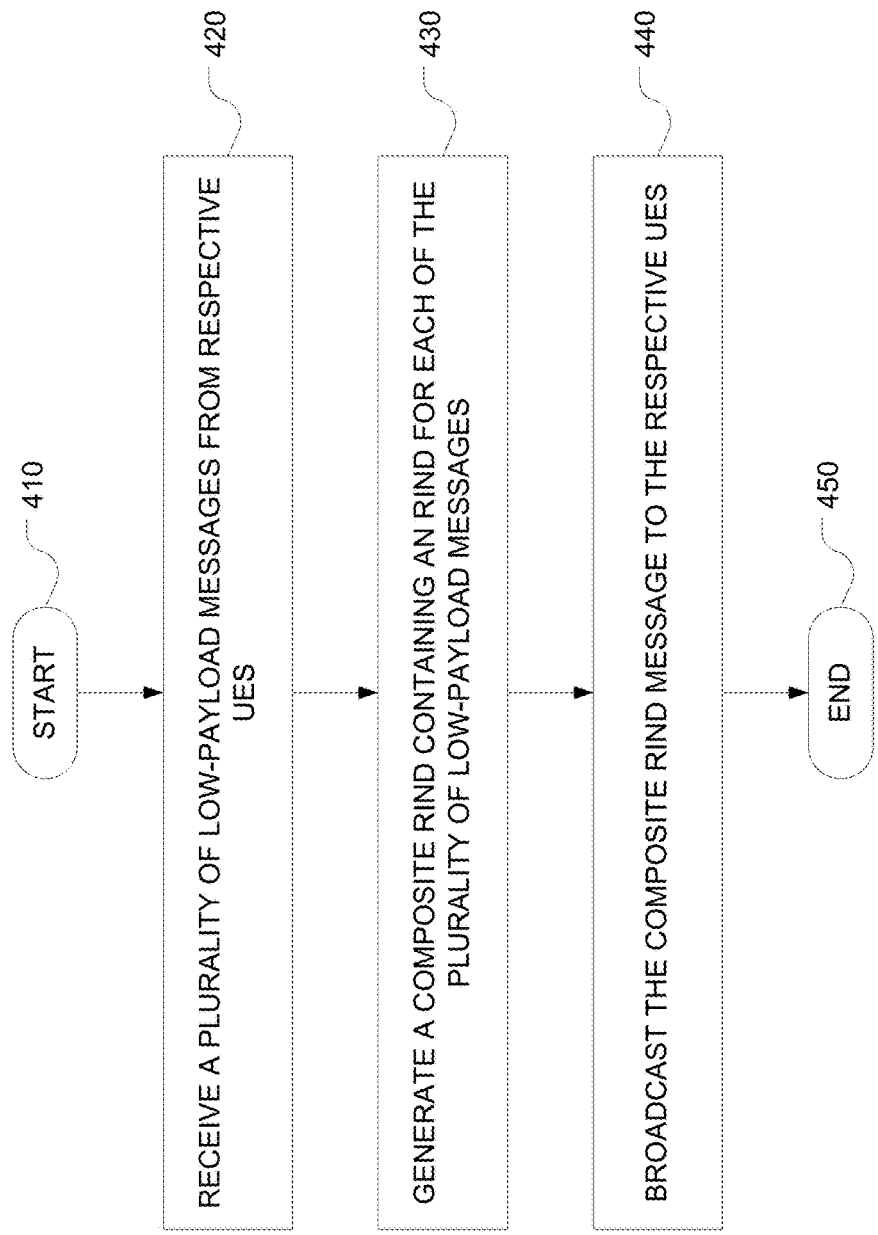
FIG. 4 is a flow diagram of one embodiment of a method of indicating reception of low-payload messages.

FIG. 4 is a flow diagram of one embodiment of a method of indicating reception of low-payload messages. The method begins at a start step 410. At a receiving step 420, a plurality of low-payload messages are received at a base station. The plurality of low-payload messages originate from respective UEs. The respective UEs can include hundreds or more distinct UEs. A given UE can also transmit multiple low-payload messages. The base station receives each low-payload message and attempts to decode the payload data in each received low-payload message (cumulatively referred to as the plurality of decoded payloads). The base station then uses the plurality of decoded payloads to generate a composite RIND at a generation step 430. In certain embodiments, the composite RIND can be a bitmap where each low-payload message is allocated at least one bit in the bitmap. In certain embodiments, the individual RINDs for the plurality of low-payload messages include an echo of the detected low-payload message. For example, a RIND for a 1-bit payload would be the one bit of payload detected by the base station. In alternative embodiments, where the payload is sufficiently large, the individual RINDs can be signatures computed for each payload. Once the composite RIND is generated, the composite RIND is broadcast to the respective UEs at a broadcasting step 440. In certain embodiments, the composite RIND is encoded using forward error correction (FEC). In alternative embodiments, a CRC is computed for the composite RIND and appended to the transmission. The method ends at step 450.

Figure 5:
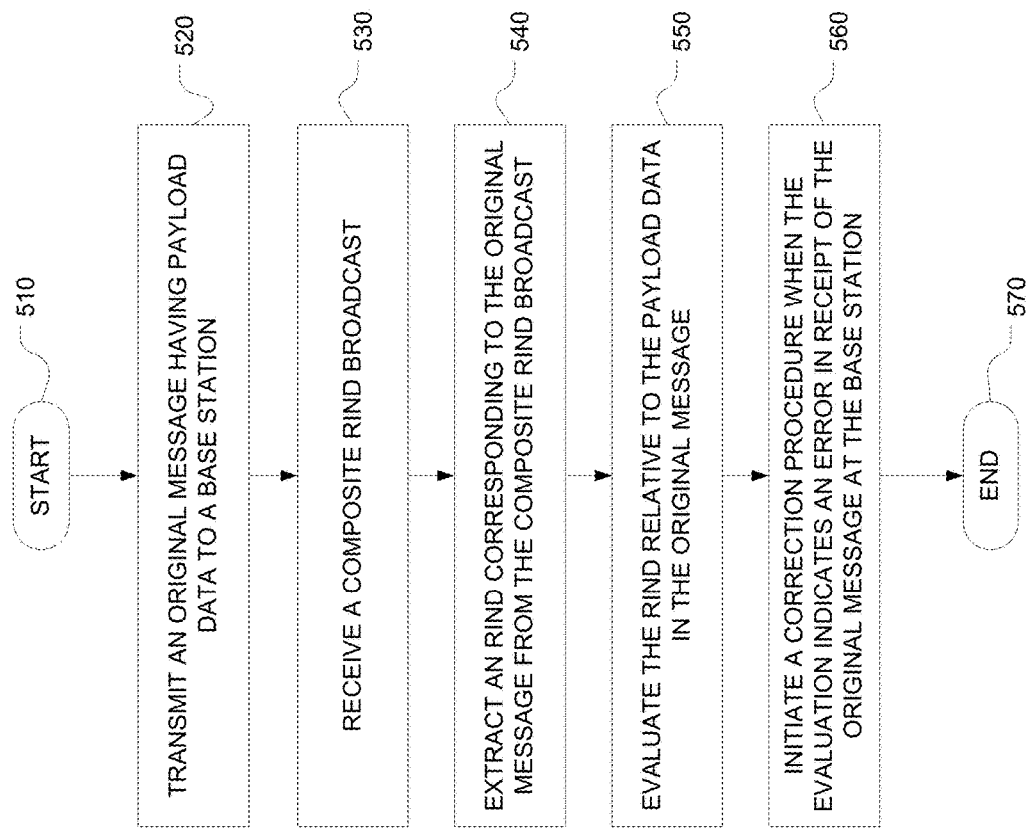
FIG. 5 is a flow diagram of one embodiment of a method of transmitting a low-payload message.

In alternative embodiments, the base station starts a correction period timer T1 and waits for reception of low-payload message retransmissions from one or more of the UEs. If the timer T1 expires, the received low-payload message is assumed to be correct and is processed by the base station. If a low-payload message retransmission is received before the expiration of the timer, then the base station discards the low-payload message originally received and generates a RIND for the retransmitted low-payload message. The method ends at an end step 450. Those skilled in the art will appreciate that there are a plurality of different mechanisms that can be employed in place of a timer, including setting an alert for an absolute time FIG. 5 is a flow diagram of one embodiment of a method of transmitting a low-payload message. The method begins at a start step 510. At a transmitting step 520, an original low-payload message is transmitted to a base station by a UE. The original low-payload message has a payload. The size of the payload can vary for different communication systems. At a receiving step 530, a composite RIND broadcast transmitted by the base station is received by the UE. At an extraction step 540, the UE extracts a RIND from the composite RIND message associated with the original low-payload message. Which portions of the composite RIND correspond to the UE can be predetermined, such as through a negotiation or system setup. In alternative embodiments, the UE can determine which portion of the composite RIND corresponds to the original low-payload message by analyzing other data in the composite RIND, such as headers.

At an evaluation step 550, the UE evaluates the extracted RIND relative to the payload data in the original low-payload message. In certain embodiments, where the RIND includes an echo of the payload data detected by the base station, the evaluation includes a comparison of the original payload data to the payload data in the RIND. In alternative embodiments, the evaluation includes a comparison of a signature computed by the base station and included in the RIND. If a RIND corresponding to the original low-payload message is not included in the composite RIND, the UE assumes that an error occurred in receipt of the original low-payload message at the base station.

At a correcting step 560, a correction procedure is initiated according to the result of evaluation step 550. When the evaluation indicates an error in receipt of the original low-payload message at the base station, the correction procedure is initiated. When the evaluation indicates the receipt of the original low-payload message was successful, the correction procedure is not initiated. The correction procedure can include a variety of steps, including retransmitting the original payload, transmitting a new low-payload message carrying new payload data, or transmitting additional data over a designated UL channel. The method ends at step 570.

Figure 6:
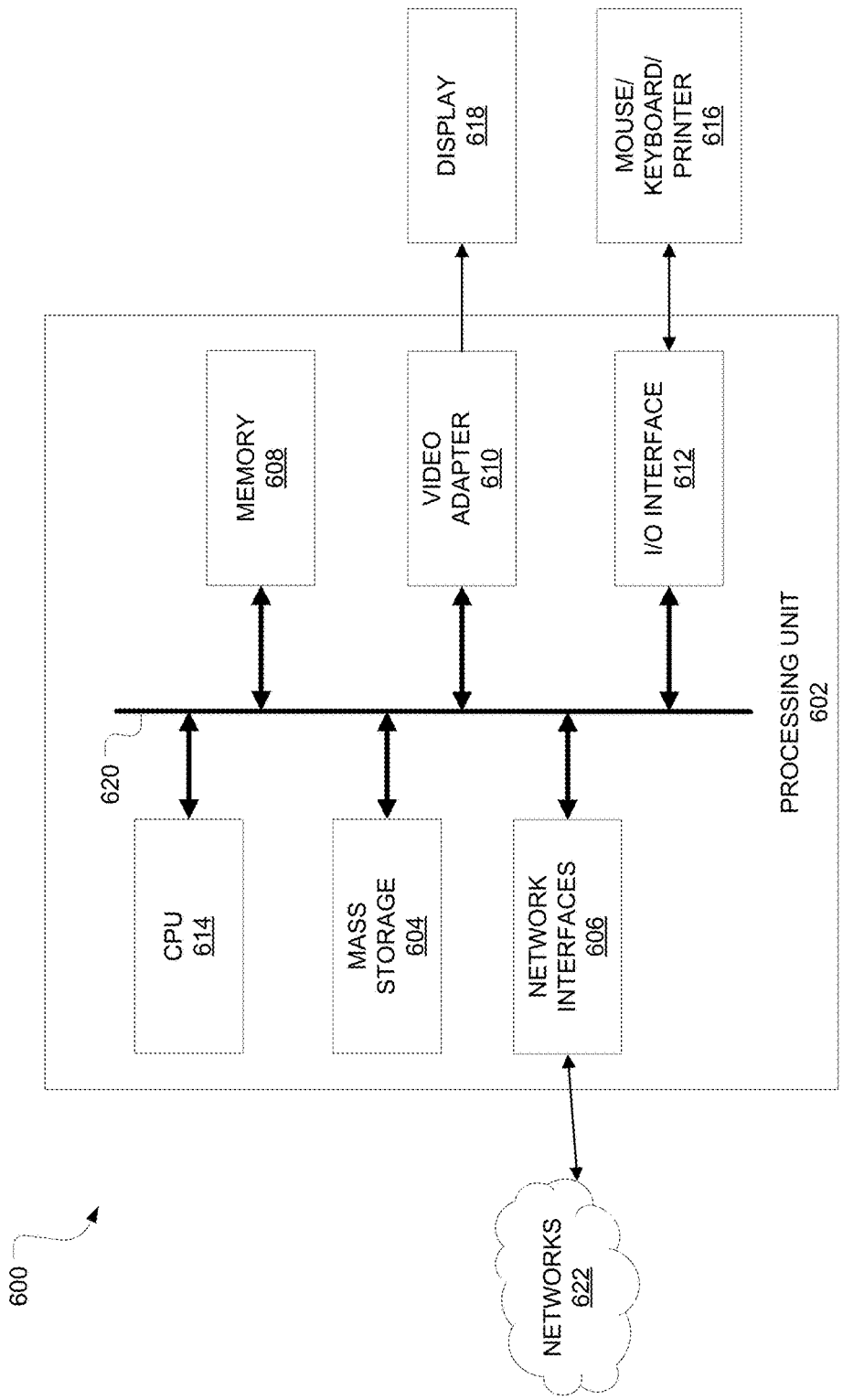
FIG. 6 is a block diagram of one embodiment of a computing system.

FIG. 6 is a block diagram of a computing system 600 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 600 may comprise a processing unit 602 that may be equipped with one or more input/output devices, such as a speaker, microphone, mouse, touchscreen, keypad, keyboard, printer, display, and the like. The processing unit 602 may include a central processing unit (CPU) 614, a memory 608, a mass storage device 604, a video adapter 610, and an I/O interface 612 connected to a bus 620.

The bus 620 may be one or more of any type of several bus architectures including a memory bus or memory controller, a peripheral bus, video bus, or the like. The CPU 614 may comprise any type of electronic data processor. The memory 608 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 608 may include ROM for use at boot-up, and DRAM for program and data storage for use while executing programs.

The mass storage device 604 may comprise any type of non-transitory storage device configured to store data, programs, and other information and to make the data, programs, and other information accessible via the bus 620. The mass storage device 604 may comprise, for example, one or more of a solid state drive, hard disk drive, a magnetic disk drive, an optical disk drive, or the like.

The video adapter 610 and the I/O interface 612 provide interfaces to couple external input and output devices to the processing unit 602. As illustrated, examples of input and output devices include a display 618 coupled to the video adapter 610 and a mouse/keyboard/printer 616 coupled to the I/O interface 612. Other devices may be coupled to the processing unit 602 and additional or fewer interface cards may be utilized. For example, a serial interface such as Universal Serial Bus (USB) (not shown) may be used to provide an interface for a printer.

The processing unit 602 also includes one or more network interfaces 606, which may comprise wired links, such as an Ethernet cable or the like, and/or wireless links to access nodes or different networks. The network interfaces 606 allow the processing unit 602 to communicate with remote units via networks. For example, the network interfaces 606 may provide wireless communication via one or more transmitters/transmit antennas and one or more receivers/receive antennas. In an embodiment, the processing unit 602 is coupled to one or more local-area networks 622 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of indicating reception of low-payload messages, comprising:
   receiving, by a base station, a plurality of low-payload messages from a plurality of user equipments (UEs);
   generating reception indications (RINDs) for the plurality of low-payload messages, each of the RINDs comprising information indicating payload data received in a corresponding low-payload message, the information indicating the payload data comprising at least one of a copy of the payload data, or a signature for the payload data in the corresponding low-payload message;
   generating a composite RIND containing the RINDs; and
   transmitting the composite RIND to at least one UE in the plurality of UEs, the composite RIND prompting the at least one UE to compare information indicating payload data of a corresponding RIND in the composite RIND with at least one of payload data, or a signature for the payload data, of a transmitted low-payload message, to determine whether the transmitted low-payload message was successfully received by the base station.

2. The method of claim 1 wherein each of the plurality of low-payload messages comprises between one and thirty two bits of payload data, inclusively.

3. The method of claim 1 wherein at least one of the plurality of low-payload messages is received without an error checking code.

4. The method of claim 1 wherein generating the RINDs comprises generating a first RIND for a first low-payload message in the plurality of low-payload messages by repeating the first low-payload message.

5. The method of claim 1 wherein generating the RINDs comprises generating a first RIND for a first low-payload message in the plurality of low-payload messages by computing a signature associated with the first low-payload message.

6. The method of claim 1 wherein generating the composite RIND comprises encoding the composite RIND using a forward error correction code.

7. The method of claim 1 wherein generating the composite RIND comprises encoding the composite RIND using a cyclic redundancy check.

8. The method of claim 1 wherein transmitting the composite RIND comprises broadcasting a message including the composite RIND.

9. The method of claim 1 further comprising:
   waiting for a correction period of time after transmitting the composite RIND; and
   receiving, during the correction period of time, at least one correction message from at least one of the plurality of UEs in response to the composite RIND.

10. The method of claim 1 further comprising allocating resources in a physical downlink channel (PDCH), wherein the composite RIND is transmitted over the PDCH.

11. The method of claim 1 further comprising detecting payload data in the plurality of low-payload messages.

12. The method of claim 1 wherein generating the RINDs comprises determining a disposition instruction for each of the plurality of low-payload messages, the disposition instruction instructing a UE that transmits a corresponding low-payload message in the plurality of low-payload messages to perform transmissions according to the disposition instruction.

13. A method of transmitting a low-payload message, comprising:
   transmitting, by a user equipment (UE), an original message having payload data to a base station;
   receiving a composite reception indication (RIND) broadcast over a broadcast channel, the composite RIND comprising a plurality of RINDs corresponding to a plurality of messages received by the base station, wherein each of the plurality of RINDs indicates that a corresponding message in the plurality of messages has been received by the base station, and each of the plurality of RINDs comprises information indicating payload data received in a corresponding message by the base station, the information indicating the payload data comprising at least one of a copy of the payload data, or a signature for the payload data received in the corresponding message;
   extracting a RIND corresponding to the original message transmitted by the UE from the composite RIND;
   evaluating the extracted RIND relative to the payload data in the original message to determine whether the original message was successfully received by the base station, wherein the evaluating is performed by comparing information indicating payload data of the extracted RIND with at least one of payload data, or a signature for the payload data, of the original message; and
   initiating a correction procedure when the evaluating indicates an error in receiving the original message at the base station.

14. The method of claim 13 wherein the original message transmitted does not contain an error checking code corresponding to the payload data.

15. The method of claim 13 wherein extracting the RIND corresponding to the original message comprises extracting the RIND at a predetermined position in the composite RIND.

16. The method of claim 13 wherein extracting the RIND corresponding to the original message comprises evaluating a header associated with each RIND in the composite RIND.

17. The method of claim 13 wherein evaluating the extracted RIND comprises comparing a value of the extracted RIND to a value of the payload data.

18. The method of claim 13 wherein evaluating the extracted RIND comprises comparing a value of the extracted RIND to a signature for the payload data.

19. The method of claim 13 wherein the correction procedure comprises retransmitting the payload data in a new message to the base station.

20. The method of claim 13 wherein the correction procedure comprises transmitting a new message including updated data corresponding to the payload data.

21. The method of claim 13 wherein the payload data comprises between one and thirty two bits of data, inclusively.

22. A base station, comprising:
   a receiver configured to receive a plurality of low-payload messages from a plurality of user equipments (UEs) and detect payload data carried in the plurality of low-payload messages;
   a transmitter configured to transmit a composite reception indication (RIND) to at least one UE in the plurality of UEs, the composite RIND comprising a plurality of RINDs corresponding to the plurality of low-payload messages, wherein each of the plurality of RINDs indicates that a corresponding low-payload message has been received by the base station, and each of the RIND comprises information indicating payload data received in a corresponding low-payload message, the information indicating the payload data comprising at least one of a copy of the payload data, or a signature for the payload data in the corresponding low-payload message, the composite RIND prompting the at least one UE to compare information indicating payload data of a corresponding RIND in the composite RIND with at least one of payload data, or a signature for the payload data, of a transmitted low-payload message, to determine whether the transmitted low-payload message was successfully received by the base station; and a processor coupled to the receiver and the transmitter, and having a radio resource controller (RRC) configured to provision physical uplink channels (PUCHs) over which the plurality of low-payload messages are received, wherein the processor is configured to generate the composite RIND according to the payload data.

23. A user equipment (UE), comprising:

a transmitter configured to transmit an original message having payload data to a base station;

a receiver configured to receive a composite reception indication (RIND), the composite RIND comprising a plurality of RINDs corresponding to a plurality of messages received by the base station, wherein each of the plurality of RINDs indicates receipt of a corresponding message by the base station, and wherein each of the plurality of RINDs comprises information indicating payload data of a corresponding message received by the base station, the information indicating the payload data comprising at least one of a copy of the payload data, or a signature for the payload data received in the corresponding message; and a processor coupled to the transmitter and the receiver, and configured to:

extract a RIND corresponding to the original message from the composite RIND, evaluate the extracted RIND to determine whether the original message was successfully received by the base station by comparing information indicating payload data of the extracted RIND with payload data in the original message or a signature for the payload data in the original message, and initiate a correction procedure when evaluating the extracted RIND indicates an error in receiving the original message at the base station.

24. The method of claim 1 wherein the at least one UE in the plurality of UEs compares the corresponding RIND in the composite RIND with contents of the low-payload message transmitted by the at least one UE by comparing the corresponding RIND with the payload data in the low-payload message.

25. The method of claim 1 wherein the at least one UE compares the corresponding RIND in the composite RIND with contents of the low-payload message transmitted by the at least one UE by comparing the corresponding RIND with a signature derived from the payload data in the low-payload message.

26. The method of claim 1 wherein the low-payload message transmitted by the at least one UE excludes error detection information for payload data of the low-payload message transmitted by the at least one UE.

27. The method of claim 13 wherein comparing the extracted RIND with at least one of payload data, or a signature for the payload data of the original message comprises comparing the extracted RIND with a signature derived from the payload data in the original message.

28. The method of claim 13 wherein the original message excludes error detection information for payload data of the original message.

* * * * *